(12) United States Patent
Cherif

(10) Patent No.: US 8,610,691 B2
(45) Date of Patent: Dec. 17, 2013

(54) RESISTIVE TOUCH SCREEN AND METHOD FOR MANUFACTURING SAME

(75) Inventor: Mondher Cherif, Holland, MI (US)

(73) Assignee: TPK Touch Solutions Inc., Taipei (TW)

( * ) Notice: Subject to any disclaimer, the term of this patent is extended or adjusted under 35 U.S.C. 154(b) by 954 days.

(21) Appl. No.: 12/537,620

(22) Filed: Aug. 7, 2009

(65) Prior Publication Data

US 2010/0156842 A1    Jun. 24, 2010

Related U.S. Application Data

(60) Provisional application No. 61/090,004, filed on Aug. 19, 2008.

(51) Int. Cl.
*G06F 3/045* (2006.01)

(52) U.S. Cl.
USPC .......................................... 345/174; 345/173

(58) Field of Classification Search
USPC .................................................. 345/173–177
See application file for complete search history.

(56) References Cited

U.S. PATENT DOCUMENTS

| | | | |
|---|---|---|---|
| 3,020,193 A | 2/1962 | Seek | |
| 3,293,743 A | 12/1966 | Barnard | |
| 3,415,706 A | 12/1968 | Ettre | |
| 4,290,052 A | 9/1981 | Eichelberger et al. | |
| 4,318,958 A | 3/1982 | Piatt | |
| 4,490,227 A | 12/1984 | Bitter | |
| 4,650,557 A | 3/1987 | Bitter | |
| 4,655,811 A | 4/1987 | Bitter | |
| 4,786,767 A | 11/1988 | Kuhlman | |
| 4,838,656 A | 6/1989 | Stoddard | |
| 4,864,084 A | 9/1989 | Cardinale | |
| 4,931,782 A | 6/1990 | Jackson | |
| 5,011,732 A | 4/1991 | Takeuchi et al. | |
| 5,062,198 A | 11/1991 | Sun | |
| 5,239,152 A | 8/1993 | Caldwell et al. | |
| 5,277,986 A | 1/1994 | Cronin et al. | |
| 5,525,264 A | 6/1996 | Cronin et al. | |
| 5,530,240 A | 6/1996 | Larson et al. | |
| 5,538,905 A | 7/1996 | Nishioka et al. | |
| 5,604,626 A | 2/1997 | Teowee et al. | |
| 5,668,663 A | 9/1997 | Varaprasad et al. | |
| 5,673,041 A | 9/1997 | Chatigny et al. | |
| 5,689,157 A | 11/1997 | Jitsukata et al. | |
| 5,719,705 A | 2/1998 | Machol | |
| 5,724,187 A | 3/1998 | Varaprasad et al. | |
| 5,725,957 A | 3/1998 | Varaprasad et al. | |
| 5,729,379 A | 3/1998 | Allemand et al. | |

(Continued)

FOREIGN PATENT DOCUMENTS

| | | |
|---|---|---|
| WO | WO 2009/006512 | 1/2009 |
| WO | WO 2009/018094 | 2/2009 |

*Primary Examiner* — Alexander Eisen
*Assistant Examiner* — Robin Mishler
(74) *Attorney, Agent, or Firm* — Gokalp Bayramoglu; Anna Tsang

(57) ABSTRACT

A touch screen and method for manufacturing a touch screen includes a transparent substrate having a first surface and a second surface opposite the first surface. The transparent substrate has a first transparent conductive layer disposed on the first surface. A cover sheet is spaced from the substrate by a plurality of spacer elements and has a second transparent conductive layer coated at a surface of the cover sheet and opposed to the first transparent conductive layer. An electromagnetic interference shield is disposed at the second surface of the transparent substrate. The electromagnetic interference shield includes a third transparent conductive layer.

6 Claims, 1 Drawing Sheet

(56) References Cited

U.S. PATENT DOCUMENTS

| | | |
|---|---|---|
| 5,742,118 A | 4/1998 | Endo et al. |
| 5,838,483 A | 11/1998 | Teowee et al. |
| 5,900,275 A | 5/1999 | Cronin et al. |
| 6,001,486 A | 12/1999 | Varaprasad et al. |
| 6,040,939 A | 3/2000 | Demiryont et al. |
| 6,087,012 A | 7/2000 | Varaprasad et al. |
| 6,163,313 A | 12/2000 | Aroyan et al. |
| 6,261,700 B1 | 7/2001 | Olson et al. |
| 6,277,485 B1 | 8/2001 | Invie et al. |
| 6,329,925 B1 | 12/2001 | Skiver et al. |
| 6,344,288 B1 | 2/2002 | Oyama et al. |
| 6,362,414 B1 | 3/2002 | Fujisawa et al. |
| 6,380,480 B1 | 4/2002 | Norimatsu et al. |
| 6,395,863 B2 | 5/2002 | Geaghan |
| 6,440,491 B1 | 8/2002 | Varaprasad et al. |
| 6,444,898 B1 | 9/2002 | Fujisawa et al. |
| 6,488,981 B1 | 12/2002 | Richter et al. |
| 6,549,193 B1 | 4/2003 | Huang et al. |
| 6,620,454 B2 | 9/2003 | Varaprasad et al. |
| 6,627,918 B2 | 9/2003 | Getz et al. |
| 6,690,268 B2 | 2/2004 | Schofield et al. |
| 6,706,552 B2 | 3/2004 | Getz et al. |
| 6,727,895 B2 | 4/2004 | Bottari et al. |
| 6,787,240 B2 | 9/2004 | Getz |
| 6,842,171 B2 | 1/2005 | Richter et al. |
| 7,004,592 B2 | 2/2006 | Varaprasad et al. |
| 7,154,481 B2 * | 12/2006 | Cross et al. .................... 345/173 |
| 7,165,323 B2 | 1/2007 | Halsey, IV et al. |
| 7,184,190 B2 | 2/2007 | McCabe et al. |
| 7,195,381 B2 | 3/2007 | Lynam et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,295,189 B2 * | 11/2007 | Ostergard ..................... 345/173 |
| 7,370,983 B2 | 5/2008 | DeWind et al. |
| 7,397,466 B2 * | 7/2008 | Bourdelais et al. ........... 345/173 |
| 7,446,650 B2 | 11/2008 | Scholfield et al. |
| 7,507,438 B2 | 3/2009 | Cherif et al. |
| 7,574,794 B2 | 8/2009 | Halsey, IV et al. |
| 7,626,749 B2 | 12/2009 | Baur et al. |
| 7,796,123 B1 * | 9/2010 | Irvin et al. .................... 345/173 |
| 7,889,284 B1 * | 2/2011 | Nemeth et al. .................. 349/12 |
| 2001/0024685 A1 | 9/2001 | Boulton et al. |
| 2002/0031622 A1 | 3/2002 | Ippel et al. |
| 2002/0086188 A1 | 7/2002 | Halsey, IV et al. |
| 2004/0137240 A1 | 7/2004 | Halsey, IV et al. |
| 2005/0073640 A1 * | 4/2005 | Dunn et al. .................... 349/161 |
| 2006/0050018 A1 | 3/2006 | Hutzel et al. |
| 2006/0082192 A1 | 4/2006 | Dubay et al. |
| 2006/0198089 A1 * | 9/2006 | Cho ............................. 361/681 |
| 2006/0266640 A1 | 11/2006 | Halsey, IV et al. |
| 2009/0015736 A1 | 1/2009 | Weller et al. |
| 2009/0205879 A1 | 8/2009 | Halsey, IV et al. |
| 2009/0262092 A1 | 10/2009 | Halsey, IV et al. |
| 2009/0322705 A1 | 12/2009 | Halsey, IV |

\* cited by examiner

RESISTIVE TOUCH SCREEN AND METHOD FOR MANUFACTURING SAME

CROSS REFERENCE TO RELATED APPLICATION

The present application claims the benefit of U.S. provisional application Ser. No. 61/090,004, filed Aug. 19, 2008, which is hereby incorporated herein by reference in its entirety.

FIELD OF THE INVENTION

The present invention relates generally to touch screens and, more particularly, to resistive touch screens and methods for manufacturing resistive touch screens.

BACKGROUND OF THE INVENTION

Five-wire 5-wire resistive touch screens can be manufactured with traditional methods using ITO and fritted silver electrodes. If additional shielding is necessary, traditional methods used include a wire mesh laminated to the second surface (back) of glass or a laminated second coated PET film (typically coated with ITO or other transparent conductive oxide). In some cases, a second coated piece of glass can be laminated to the backside of the 5-wire sensor to provide shielding protection as well. Examples of various coatings and sensors or touch screens are described in U.S. Pat. Nos. 6,488,981; 6,549,193; 6,727,895; and 6,842,171, which are hereby incorporated herein by reference in their entireties.

SUMMARY OF THE INVENTION

The present invention provides a resistive sensor or touch screen. The resistive touch screen includes a transparent substrate coated with a conductive coating with a pattern of traces and with spacer means (such as spacer dots or the like) spacing a top sheet from the pattern-coated substrate. The touch screen includes an optically transparent, and preferably non-patterned, electromagnetic interference (EMI) shield disposed at a rear surface of the transparent substrate opposite and opposed from the conductively coated surface of the transparent substrate.

According to an aspect of the present invention, the optically transparent EMI shield coated on the rear surface comprises a layer of transparent conductive thin film coating, such as ITO or the like. Preferably, the transparent electrically conductive layer on the front surface of the transparent substrate and the transparent EMI shield or transparent electrically conductive layer on the rear surface of the transparent substrate comprise transparent conductive thin film coatings, and more preferably comprise the same coating material and more preferably are coated on their respective surfaces of the transparent substrate in the same sputter-up/sputter-down coating process. Such a construction provides for lower costs, improved transmission of light through the touch screen, ability to conceal or render covert the wires of the touch screen, and enhanced processing by allowing for processing of the touch screen on the mother (uncut) glass and prior to the step of cutting the glass to the touch screen size and shape. Optionally, the rear surface conductive coating may comprise a heater element for applications of the touch screen in low temperature conditions.

These and other objects, advantages, purposes and features of the present invention will become more apparent upon review of the following specification in conjunction with the drawings.

DESCRIPTION OF THE PREFERRED EMBODIMENTS

Figure 1:
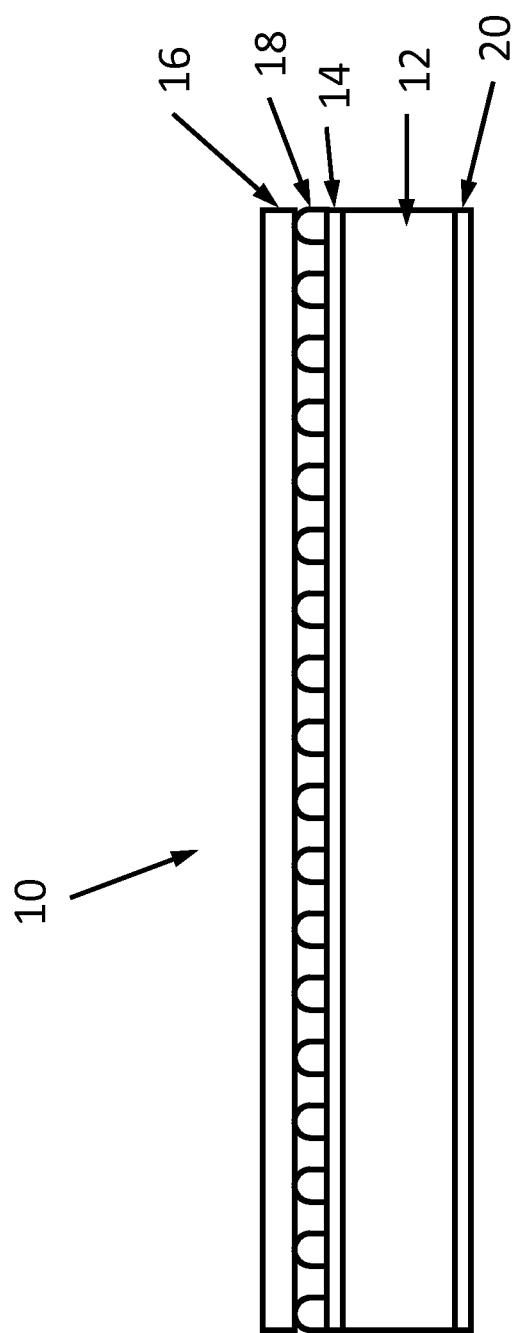
FIG. 1 is a sectional view of a touch screen in accordance with the present invention.

Referring now to the drawings and the illustrative embodiments depicted therein, a touch screen 10 in accordance with the present invention is shown in FIG. 1. In the illustrated embodiment, touch screen 10 includes a rigid or flexible substrate 12 (such as a glass plastic or polymeric substrate or the like) with a transparent electrically conductive layer 14 (such as a coating or layer of TCO or indium tin oxide (ITO) or the like) disposed on a front or top surface thereof, and a thin sheet or substrate 16 (such as a flexible mylar sheet or an ultra-thin glass substrate having a thickness of about 0.1 mm or thereabouts) spaced from the substrate 12 by a plurality of spacer dots 18. The top sheet 16 is coated at its rear or lower surface with a transparent conductive layer (such as a coating or layer of TCO or ITO or the like). Touch screen 10 includes an electromagnetic interference (EMI) shield 20 disposed at the rear or bottom surface of the substrate 12 and opposite from the conductive layer 14 on the front surface of substrate 12. EMI shield 20 comprises a second coating of a transparent electrically conductive layer, such as ITO or the like, as discussed below.

The EMI shield 20 is grounded via a ground connection (not shown). For example, the EMI shield may be configured or adapted at a peripheral edge of the shield coating (such as at or near a peripheral edge of the transparent substrate) for electrical ground connection, such as via a tab out portion or wraparound portion or terminal established at the rear surface or perimeter edge region of the transparent substrate, such as by utilizing aspects of the coatings described in U.S. Pat. Nos. 7,400,435; 7,184,190 and/or 7,255,451, and/or U.S. patent application Ser. No. 11/226,628, filed Sep. 14, 2005; and/or Ser. No. 11/912,576, filed Oct. 25, 2007, and/or PCT Application No. PCT/US2007/082099, filed Oct. 22, 2007 and published May 2, 2008 as International Publication No. WO 2008/051910, which are hereby incorporated herein by reference in their entireties.

In the illustrated embodiment, the touch screen 10 comprises a "5-wire" resistive touch screen, with the circuit established on the substrate 12 and with the top sheet 16 comprising mylar or the like and used as a contact layer. Optionally, aspects of the present invention may be suitable for use on 4-wire resistive touch screens, while remaining within the spirit and scope of the present invention.

Because of the reduction process that may be used for a 5-wire resistive touch screen, the method of manufacturing may coat a second layer of ITO on the backside of the glass substrate. For example, a manufacturing process may include screening a mask onto the substrate and coating the front surface of the substrate with a transparent conductive coating (such as ITO or the like). The pattern and traces (such as silver traces or the like) are screened onto the coated substrate surface, and the ITO coating may then be oxidized (such as via known oxidization processes or by utilizing aspects of the system described in PCT Application No. PCT/US08/068,987, filed Jul. 2, 2008, which is hereby incorporated herein by reference in its entirety). The EMI shield coating or film (such as a relatively thick layer of ITO or the like, such as an ITO layer that is at least about 500 Angstroms thick, and preferably at least about 1,000 Angstroms thick, and preferably at least about 10,000 Angstroms thick, such as about 18,000 Angstroms thick, and optionally more than about 20,000 Angstroms thick or more or less) is coated (such as via sputter coating or the like) onto the rear or opposite surface of the glass substrate, and the front ITO surface may be reduced (such as via known reduction processes or by utilizing aspects of the system described in PCT Application No. PCT/US08/068987, filed Jul. 2, 2008, which is hereby incorporated herein by reference in its entirety). Of course other transparent conductive layers may be used, such as AZO coatings, TCO coatings and/or the like, while remaining within the spirit and scope of the present invention. The substrate may then be cut and seamed and washed and tested. The manufacturing process may utilize aspects of the systems and processes described in U.S. Pat. No. 4,650,557 and/or U.S. patent application Ser. No. 11/440,855, filed May 25, 2006, which are hereby incorporated herein by reference in their entireties.

Because the EMI shield comprises a transparent conductive coating that is coated onto the back side of the substrate material, and which may be done before the transparent substrate is cut and seamed, the process of the present invention provides for enhanced manufacturing as compared to conventional processes, which establish the wire mesh or laminated PET film at the back of the substrate after the substrate has been cut and seamed, thus adding an additional step to the manufacturing process. Also, with other resistive manufacturing methods that do not use reduced ITO for the first or front surface transparent conductive layer, the step of coating a second transparent conductive layer (such as ITO or the like) on the back of those sensors may result in an increase in the resistance of the front ITO layer (the non-reduced ITO layer), and in some cases a dramatic or substantial increase in the resistance of the front ITO layer, and the uniformity of such a film will be compromised.

The benefits of using a transparent conductive coating (such as a substantially non-diffusing coating having an optical transmission of at least about 70 percent of visible light therethrough, more preferably at least about 80 percent and more preferably at least about 84 percent) on the backside of the sensor as compared to the conventional use of a wire mesh or laminated PET film include the following: (a) a reduction in the processing costs; (b) enhanced or improved transmission of light through the sensor or touch screen (including through the EMI shield); (c) with the conventional wire mesh approach, the wires may be viewable through the substrate, and this is not a concern with the use of a transparent conductive coating for the EMI shield; (d) the EMI shield may be coated and/or processed on the mother (uncut) glass rather than on the cut-to-size/shape glass substrate (although the transparent EMI shield coating may be established or coated or processed on the cut glass substrate if desired, while remaining within the spirit and scope of the present invention). Optionally, the rear surface conductive coating may provide other uses or benefits or functions, such as, for example, a heater element (where the conductive coating may be heated responsive to a current applied thereto) for applications or uses of the touch screen in low temperature conditions.

Optionally, one or more optical enhancing layers and/or mechanical or durability enhancing layers can be added to the EMI shield coating and/or the front surface coating or stack to adjust the properties (such as the transmissivity properties and/or appearance properties of the sensor) to meet certain customer needs. Such enhancements may include index matching of the layers with air or other media and/or alternating high and low refractive index materials to create various anti-reflective stacks (such as by utilizing aspects of the reflective elements described in U.S. Pat. Nos. 7,274,501; 7,255,451 and/or 7,184,190, and/or U.S. patent application Ser. No. 11/912,576, filed Oct. 25, 2007, which are hereby incorporated herein by reference in their entireties). Optionally, other or alternate materials (to ITO) can be used for the second layer (the transparent conductive layer disposed as the EMI shield coating on the back or rear surface of the substrate). For example, such materials may include a flourine-doped tin oxide material or the like, a copper-aluminum material or the like, a zinc oxide or ZnO material or the like, or other non-traditional TCOs if desired or appropriate. Optionally, the secondary reduction step can be modified to include an oxidation step allowing a high temperature silver frit to be printed or otherwise deposited on top of the second layer of material.

The process and/or finished touch screen product of the present invention may utilize aspects of the processes and/or products described in U.S. Pat. Nos. 4,490,227; 4,650,557; 4,655,811; 5,725,957; 6,001,486; 6,087,012; 6,440,491; 6,620,454; 6,627,918; 6,706,552; 6,488,981; 6,549,193; 6,727,895; 6,842,171; 6,787,240; and/or 7,165,323; and/or U.S. patent application Ser. No. 09/946,228, filed Sep. 5, 2001 by Ippel et al. for PLASTIC SUBSTRATE FOR INFORMATION DEVICE AND METHOD FOR MAKING SAME; Ser. No. 09/974,209, filed Oct. 10, 2001; Ser. No. 10/744,522, filed Dec. 23, 2003 by Halsey et al. for METHOD FOR MAKING AN INTERACTIVE INFORMATION DEVICE; Ser. No. 10/798,171, filed Mar. 11, 2004 by Getz for LASER DELETION FOR TOUCH SCREEN; Ser. No. 11/218,374, filed Sep. 2, 2005 by Cherif et al. for DISPLAY SUBSTRATE WITH DIFFUSER COATING, now U.S. Pat. No. 7,507,438; and/or Ser. No. 11/440,855, filed May 25, 2006, and/or U.S. provisional application Ser. No. 60/947,819, filed Jul. 3, 2007, and/or PCT Application No. PCT/US08/68987, filed Jul. 2, 2008, which are all hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A method of manufacturing a resistive touch screen comprising: providing a transparent substrate having a first surface and a second surface opposite said first surface, said transparent substrate having a first transparent conductive layer disposed on said first surface; providing a cover sheet used as a contact layer having a second transparent conductive layer coated at a surface of said cover sheet; spacing said cover sheet from said transparent substrate by a plurality of spacer elements and with said second transparent conductive layer opposing said first transparent conductive layer of said transparent substrate; and providing a grounded electromagnetic interference shield at said second surface of said transparent substrate after oxidizing, said first transparent conductive layer and before reducing said first transparent conductive layer, said grounded electromagnetic interference shield comprising a third transparent conductive layer.

2. The method of claim 1, wherein providing said grounded electromagnetic interference shield at said second surface of said transparent substrate comprises providing said grounded electromagnetic interference shield at said second surface of said transparent substrate before cutting said transparent substrate to its final form.

3. The method of claim 1, wherein said first transparent conductive layer and said grounded electromagnetic interference shield comprise the same material.

4. The method of claim 1, wherein providing said transparent substrate comprises providing said transparent substrate and coating said first surface of said transparent substrate with a first transparent conductive layer, and wherein providing said grounded electromagnetic interference shield at said second surface of said transparent substrate comprises coating said grounded electromagnetic interference shield at said second surface of said transparent substrate.

5. The method of claim 4, wherein coating said first surface of said transparent substrate with said first transparent conductive layer and coating said grounded electromagnetic interference shield at said second surface of said transparent substrate are accomplished in the same coating process.

6. The method of claim 1, further comprising providing at least one optical enhancing layer or durability enhance layer disposed on said grounded electromagnetic interference shield.

\* \* \* \* \*